（12）United States Patent
VanVuuren et al.

(10) Patent No.: US 10,414,340 B2
(45) Date of Patent: Sep. 17, 2019

(54) DISPLAY SYSTEM AND METHOD THEREOF (71) Applicant: Gentex Corporation, Zeeland, MI (US)

(72) Inventors: Mark A. VanVuuren, Dorr, MI (US);
Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 16 days.

(21) Appl. No.: 15/659,146

(22) Filed: Jul. 25, 2017

(65) Prior Publication Data

US 2017/0320436 A1 Nov. 9, 2017

Related U.S. Application Data (63) Continuation of application No. 14/215,640, filed on Mar. 17, 2014, now Pat. No. 9,758,099.

(60) Provisional application No. 61/789,489, filed on Mar. 15, 2013.

(51) Int. Cl.
B60R 1/00 (2006.01)

(52) U.S. Cl.
CPC .............. B60R 1/002 (2013.01); B60R 1/00 (2013.01); B60R 2300/70 (2013.01)

(58) Field of Classification Search
CPC .................... B60R 1/002; B60R 1/00
See application file for complete search history.

(56) References Cited

U.S. PATENT DOCUMENTS

| | | | |
|---|---|---|---|
| 5,670,935 A | 9/1997 | Schofield et al. | |
| 5,928,572 A | 7/1999 | Tonar et al. | |
| 5,998,617 A | 12/1999 | Srinivasa et al. | |
| 6,020,987 A | 2/2000 | Baumann et al. | |
| 6,037,471 A | 3/2000 | Srinivasa et al. | |

(Continued)

FOREIGN PATENT DOCUMENTS

| | | |
|---|---|---|
| WO | 1998042796 A1 | 10/1998 |
| WO | 199902621 A1 | 1/1999 |

(Continued)

OTHER PUBLICATIONS

Commonly assigned U.S. Appl. No. 61/704,869, filed Sep. 24, 2012, entitled Image Manipulation for Automotive Rearview Device.

(Continued)

Primary Examiner — Calvin Cheung
(74) Attorney, Agent, or Firm — Price Heneveld LLP; Bradley D. Johnson (57) ABSTRACT A display system for use in a vehicle is disclosed including an imager configured to capture images corresponding to a field of view rearward of the vehicle. The imager is in communication with a processing unit configured to receive data representative of the captured images from the imager. A display is in communication with the processing unit which is configured to display images based on the data representative of the captured images received by the processing unit. The processing unit is configured to receive vehicle operating data from the vehicle and data corresponding to a detection of an object in proximity of the vehicle. In response to the vehicle operating data and the object detected, the processing unit is configured to control the field of view of the at least one imager.

17 Claims, 5 Drawing Sheets (56) References Cited

U.S. PATENT DOCUMENTS

| | | | |
|---|---|---|---|
| 6,137,620 | A | 10/2000 | Guarr et al. |
| 6,141,137 | A | 10/2000 | Byker et al. |
| 6,175,164 | B1 | 1/2001 | O'Farrell et al. |
| 6,193,912 | B1 | 2/2001 | Thieste et al. |
| 6,241,916 | B1 | 6/2001 | Claussen et al. |
| 6,249,369 | B1 | 6/2001 | Theiste et al. |
| 6,519,072 | B2 | 2/2003 | Nishikitani et al. |
| 6,559,761 | B1 | 5/2003 | Miller et al. |
| 7,353,086 | B2 | 4/2008 | Ennis |
| 7,446,650 | B2 | 11/2008 | Schofield et al. |
| 7,579,939 | B2 | 8/2009 | Schofield et al. |
| 7,688,221 | B2 | 3/2010 | Watanabe et al. |
| 7,822,543 | B2 | 10/2010 | Taylor et al. |
| 7,949,152 | B2 | 5/2011 | Schofield et al. |
| 8,065,053 | B2 | 11/2011 | Stam et al. |
| 8,201,800 | B2 | 6/2012 | Filipiak |
| 8,210,695 | B2 | 7/2012 | Roth et al. |
| 8,218,007 | B2 | 7/2012 | Lee et al. |
| 8,237,909 | B2 | 8/2012 | Ostreko et al. |
| 8,264,761 | B2 | 9/2012 | Cammenga et al. |
| 8,271,187 | B2 | 9/2012 | Taylor et al. |
| 8,279,279 | B2 | 10/2012 | Hattori et al. |
| 8,305,471 | B2 | 11/2012 | Bechtel et al. |
| 8,396,653 | B2 | 3/2013 | Rottner et al. |
| 8,411,245 | B2 | 4/2013 | Lee et al. |
| 8,427,288 | B2 | 4/2013 | Schofield et al. |
| 8,543,254 | B1 | 9/2013 | Schut et al. |
| 8,543,330 | B2 | 9/2013 | Taylor et al. |
| 8,577,169 | B2 | 11/2013 | Andrus et al. |
| 8,593,521 | B2 | 11/2013 | Schofield et al. |
| 8,643,931 | B2 | 2/2014 | Cammenga et al. |
| 8,646,924 | B2 | 2/2014 | Roth et al. |
| 8,814,373 | B2 | 8/2014 | Steel et al. |
| 8,879,139 | B2 | 11/2014 | Fish, Jr. et al. |
| 8,885,240 | B2 | 11/2014 | Roth et al. |
| 8,925,891 | B2 | 1/2015 | Van Huis et al. |
| 8,960,629 | B2 | 2/2015 | Rizk et al. |
| 9,174,577 | B2 | 11/2015 | Busscher et al. |
| 9,244,249 | B2 | 1/2016 | Kim et al. |
| 9,316,347 | B2 | 4/2016 | Roth |
| 9,598,018 | B2 | 3/2017 | Lee et al. |
| 2009/0096937 | A1 | 4/2009 | Bauer et al. |
| 2010/0222959 | A1 | 9/2010 | Murata et al. |
| 2010/0309315 | A1 | 12/2010 | Hogasten et al. |
| 2011/0093179 | A1* | 4/2011 | Schofield ............ G06K 9/00818 701/93 |
| 2011/0181728 | A1* | 7/2011 | Tieman ..................... B60R 1/00 348/148 |
| 2012/0013742 | A1 | 1/2012 | Fairchild et al. |
| 2012/0062741 | A1 | 3/2012 | Stimel et al. |
| 2012/0062743 | A1 | 3/2012 | Lynam et al. |
| 2012/0327234 | A1 | 12/2012 | Fish et al. |
| 2013/0106993 | A1 | 5/2013 | Schofield et al. |
| 2013/0147945 | A1 | 6/2013 | Watanabe et al. |
| 2013/0194426 | A1 | 8/2013 | Schofield et al. |
| 2013/0208119 | A1 | 8/2013 | Tseng |
| 2013/0321629 | A1 | 12/2013 | Zhang et al. |
| 2014/0015972 | A1 | 1/2014 | Hoek et al. |
| 2014/0267727 | A1 | 9/2014 | Alaniz |
| 2014/0277940 | A1 | 9/2014 | VanVuuren et al. |

FOREIGN PATENT DOCUMENTS

| | | |
|---|---|---|
| WO | WO2011028686 | 3/2011 |
| WO | WO2012158167 | 11/2012 |
| WO | WO2013086249 | 6/2013 |
| WO | WO2013088223 | 6/2013 |
| WO | WO2013126715 | 8/2013 |

OTHER PUBLICATIONS

Commonly assigned U.S. Appl. No. 61/707,625, filed Sep. 28, 2012, entitled Integrated Spotter in Interior Electrochromic Mirror.

* cited by examiner

DISPLAY SYSTEM AND METHOD THEREOF

CROSS-REFERENCE TO RELATED APPLICATION

This application is a continuation of and claims priority to U.S. patent application Ser. No. 14/215,640, now U.S. Pat. No. 9,758,099, filed on Mar. 17, 2014, entitled "DISPLAY SYSTEM AND METHOD THEREOF," which claims priority to and the benefit under 35 U.S.C. § 119(e) of U.S. Provisional Patent Application No. 61/789,489, filed on Mar. 15, 2013, entitled "DISPLAY SYSTEM AND METHOD THEREOF," the entire disclosures of which are hereby incorporated herein by reference.

TECHNICAL FIELD

The present disclosure generally relates to a display system and method thereof, and more particularly, to a system to adjust a display system and method thereof.

SUMMARY

According to one aspect of the present disclosure, a display system for use in a vehicle is disclosed including an imager configured to capture images corresponding to a field of view rearward of the vehicle. The imager is in communication with a processing unit configured to receive data representative of the captured images from the imager. A display is in communication with the processing unit which is configured to display images based on the data representative of the captured images received by the processing unit. The processing unit is configured to receive vehicle operating data from the vehicle and data corresponding to a detection of an object in proximity of the vehicle. In response to the vehicle operating data and the object detected, the processing unit is configured to control the field of view of the images displayed on the display.

In another aspect of the present disclosure, a system for presenting a rearward view from a vehicle is disclosed including an imager configured to capture images corresponding to an optic field of view rearward of the vehicle. The imager is in communication with a processing unit configured to receive data representative of the captured images. A display is also in communication with the processing unit. The display is configured to display images based on the data representative of the captured images received by the processing unit in a displayed field of view. The processing unit is configured to receive vehicle operating data from the vehicle, and process the data representative of the captured images to detect an object in the optic field of view. The processor is further configured to dynamically alter the displayed field of view of the data representative of the captured images based on the vehicle operating data from the vehicle and the object detected in the optic field of view.

In yet another aspect of the present disclosure, a method of controlling a display system of a vehicle is disclosed. The method includes various steps implemented by a processing including receiving and analyzing image data of a scene rearward of a vehicle and receiving vehicle operating data. The method further includes detecting an object in the image data and displaying the image data on a display. Based on the vehicle operating data and the object detected in the image data, the processing unit is configured dynamically alter the displayed image by at least one of altering the field of view of the imager and processing the image data to alter the field of view displayed on the display.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

The present illustrated implementations reside primarily in combinations of method steps and apparatus components related to a display system and method thereof. Accordingly, the apparatus components and method steps have been represented, where appropriate, by conventional symbols in the drawings, showing only those specific details that are pertinent to understanding the implementations of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element that follows "comprises . . . a" does not, without more constraints, preclude the existence of additional identical elements in the process, method, article, or apparatus that comprises the element.

Figure 1:
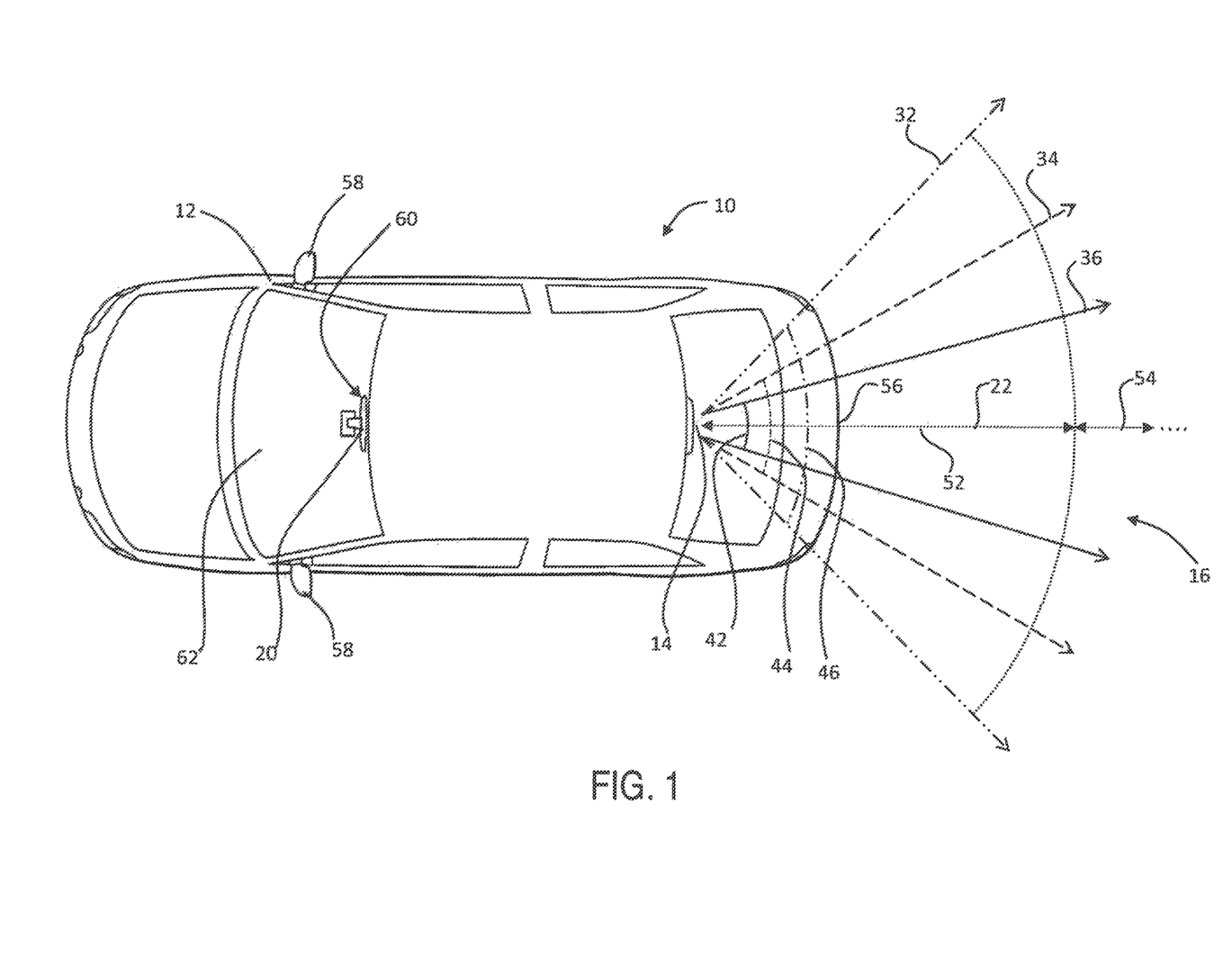
FIG. 1 is a diagram of a vehicle having a display system demonstrating a controllable field of view of an imager.
Figure 2:
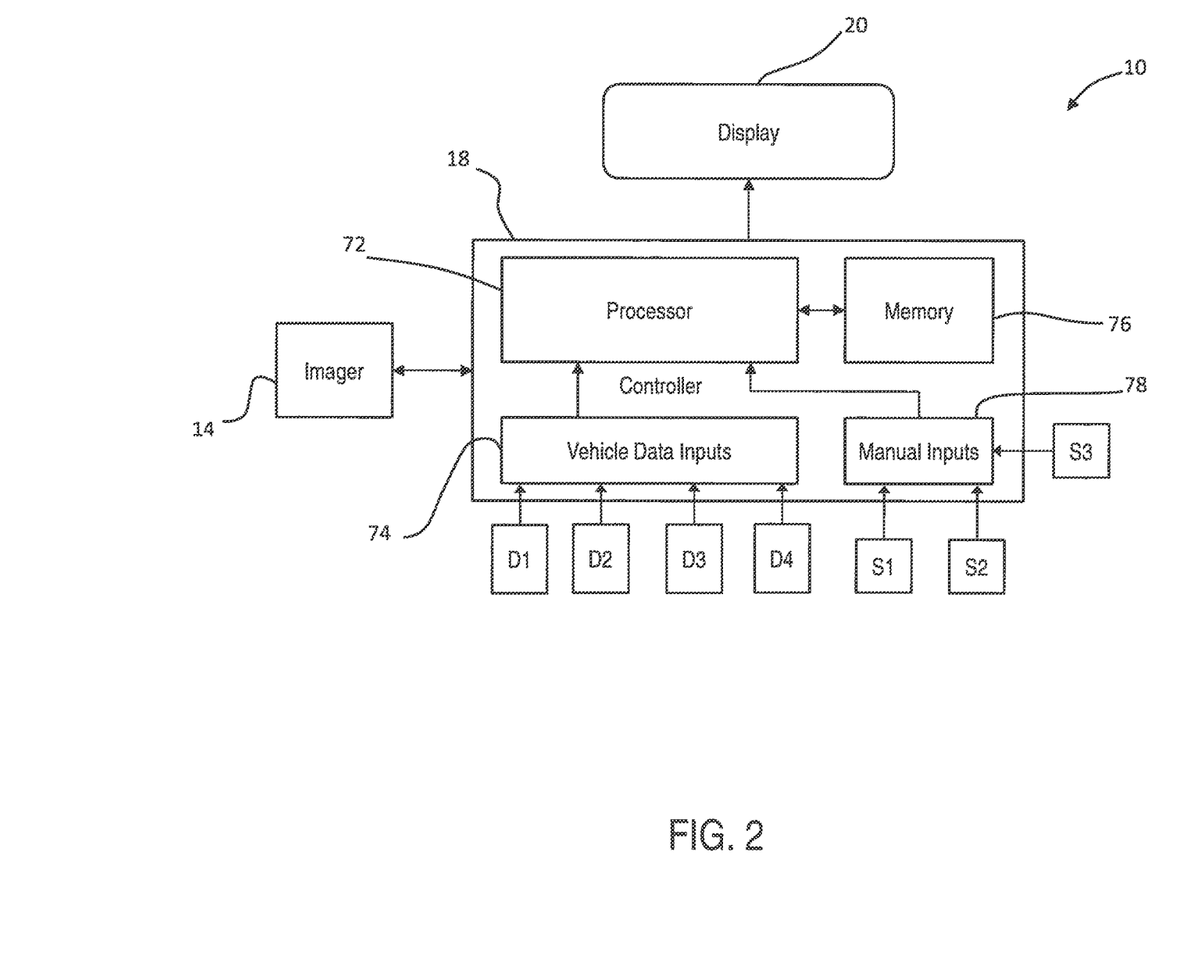
FIG. 2 is a is block diagram of a display system for a vehicle.

Referring to FIGS. 1 and 2, a display system 10 for use in a vehicle 12 is shown having an imager 14 configured to capture images corresponding to a field of view 16 rearward of the vehicle 12. A processing unit 18 is in communication with the imager 14 and is configured to receive data representative of the captured images from the imager 14. A display 20 is further in communication with the processing unit 18 and is configured to display images based on the data representative of the captured images received by the processing unit 18. The processing unit 18 is configured to receive vehicle operating data from the vehicle 12 and is further configured to process the data representative of the captured images to detect an object within a proximity 22 of the vehicle 12. In response to the vehicle operating data and the object detected in the data representative of the captured images, the processing unit 18 is configured to alter the field of view 16 of the captured images shown on display 20.

By incorporating the display system 10 in the vehicle 12, the disclosure provides for various improvements allowing vehicle operators to be more aware of an operating environment by displaying the most relevant information to the operator depending on the operating data of the vehicle and an object in proximity of the vehicle. The system 10 disclosed herein provides improvements in safety by providing intelligent control of a field of view shown on the display 20 to provide information to the operator that may not otherwise be clearly visible in standard rearview display. Further, by controlling the field of view in response to the detection of an object and the vehicle operating information, the system 10 ensures that all of the pertinent information in a rearward field of view can be displayed for an operator in response to the detection of the object. Other benefits and advantages of the system disclosed herein are further discussed in the following description.

Referring to FIG. 1, the display system 10 is shown in the vehicle 12 illustrating a control of the field of view 16. In this implementation, the display system 10 is configured to display a selected one of a first field of view 32 and a second field of view 34 on the display 20. In some implementations, the system may further be configured to display a third field of view 36. The field of view of the system is changed in response to a combination of the operating data from the vehicle and an objected being detected in the proximity 22 to the vehicle 12. By controlling the fields of view 32, 34, 36 in response to the vehicle operating information, the system 10 is operable to focus on the most relevant information for a variety of operating conditions and display the information on the display 20 to ensure that a vehicle operator is aware of an operating environment rearward of the vehicle 12.

The operating data from the vehicle 12 may communicate a speed of the vehicle 12 to the processing unit 18. In response to the vehicle 12 exceeding a first speed threshold, the processor 18 may change the field of view 16 from the first field of view 32 to the second field of view 34. Further, in response to the vehicle 12 vehicle exceeding a second speed threshold, the processor 18 may change the field of view 16 from the second field of view 34 to the third field of view 36. The vehicle speed as reported to the processor from the vehicle operating information refers to a speed of the forward motion of the vehicle 12.

Each of the fields of view 32, 34, 36 may correspond to a viewing angle of the imager 14. The first field of view 32 may have a first viewing angle 42 that is the largest of the fields of view 32, 34, 36 or correspond to an image displayed on the display 20 that focuses on the largest area of the rearward facing field of view 16 relative to the vehicle 12. The second field of view 34 may have a second viewing angle 44 that is smaller or focused on a smaller area than the first field of view 32. The third field of view 36 may have a third viewing angle 46 that is smaller than the first and second fields of view 32, 34 or focuses on a smaller area than the first and second fields of view 32, 34. Each of the fields of view may correspond to an optical field of view of the imager 14 or an extent of the field of view 16 displayed on the display 20 that effectively corresponds to a larger or smaller viewing area rearward the vehicle 12, for example as generated by a digital zoom of the captured images from the imager 14.

The first viewing angle 42 may range from approximately 180 degrees or greater to approximately 70 degrees. In some implementations the first viewing angle 42 may be approximately 100 degrees plus or minus 25 degrees and in some cases may be approximately 80 degrees. The second viewing angle 44 may range from approximately 80 degrees to approximately 45 degrees. In some implementations the second viewing angle 44 may be approximately 60 degrees plus or minus 10 degrees and in some cases may be approximately 60 degrees. The third viewing angle 46 may range from approximately 60 degrees to approximately 20 degrees. In some implementations, the second viewing angle 44 may be approximately 40 degrees plus or minus 10 degrees and in some cases may be approximately 40 degrees.

The first speed threshold may correspond to speed that is slower than the second speed threshold. The speed thresholds may be set to correspond to a particular operating environment of a particular vehicle and may vary depending on the application of the display system 10. For example, a large truck may be configured to have different speed thresholds and corresponding viewing angles 42, 44, 46 based on a particular range of operating speeds that may vary based on a geographic location or region of operation. A sports car may have different speed thresholds and corresponding viewing angles 42, 44, 46 based on the expected operating speeds and environments of the vehicle. Some vehicles may be configured to operate on highways where an effective speed limit may be approximately 70 mph (app. 115 kph). As an illustration to promote understanding of the disclosure, the first speed threshold may be approximately 30 mph (app. 50 kph), and the second speed threshold may be approximately 50 mph (app. 90 kph).

The fields of view 32, 34, 36 may be optically or digitally altered or changed by the processing unit 18 to display each one of the viewing angles 42, 44, 46 in response to the speed thresholds. The captured images or the data representative of the captured images may be altered or changed in a variety of ways by the processing unit 18 and may be implemented differently depending on a particular implementation of the system 10 (e.g., digital alteration, optical alteration, etc.). If the system 10 digitally alters the displayed image, the image data representative of the scene rearward of the vehicle 12 is then altered by the processing unit 18 and displayed on the display. If the system implements an optical zoom, the captured images are optically altered by the field of view 16 of the imager 14. The imager 14 may comprise various zoom ratios that may be changed in response to the speed of the vehicle 12. For example, as the vehicle 12 passes the first speed threshold the imager may zoom in on a scene to the rear of the vehicle 12. The field of view 16 of the imager 14 may be approximately 180 degrees or less, but may vary depending on a specific implementation of the system 10.

The system 10 is further operable to detect an object in the proximity 22 of the vehicle. The proximity 22 of an object may correspond to a vehicle being detected in the data corresponding to the captured images from the imager 14 and be detected by the processor 18 by processing the data. The processor 18 may be configured to detect an object in the proximity 22 of the vehicle 12 in a first distance range 52. The processor 18 may further be operable to determine if an object is outside the first range 52 and in a second distance range 54 that is further from the vehicle 12 than the first distance range 52. In order to detect a vehicle within the first distance range, the processor may process the data corresponding to the captured images and scan the pixel values of the data to detect an object that corresponds to an object in the form of a substantially uniform group of pixel values.

The distance of the object may be determined based on a variety of methods including a size or proportion of the object in the field of view 16, a position or height of an object along a detected horizon captured in the field of view 16, and/or a comparison of various objects that are stored in a memory of the processing unit 18. The information stored in the memory may be accessed by the processing unit 18 to provide various thresholds or proportions of an object to determine if the object is within the proximity 22 or the first distance range 52. In some implementations, the distance of an object may be detected by additional systems that may be incorporated in the vehicle 12. For example, the processing unit 18 may be in communication with at least one of a proximity sensor, an ultrasonic proximity sensor, or any other type of sensor that may be configured to detect a presence of an object at a predetermined distance.

Systems demonstrating various detection techniques that may be implemented in the display system 10 are further discussed in detail in U.S. Publication No. US 2014/0015972 A1, now U.S. Pat. No. 9,767,695 entitled "STAND ALONE BLIND SPOT DETECTION SYSTEM," filed on Jul. 11, 2013, by Steven G. Hoek et al.; U.S. Pat. No. 8,577,169, entitled "DIGITAL IMAGE PROCESSING AND SYSTEMS INCORPORATING THE SAME," filed on Feb. 1, 2010, by Jeremy C. Andrus et al.; U.S. Pat. No. 8,065,053 B2, entitled "IMAGE ACQUISITION AND PROCESSING SYSTEMS FOR VEHICLE EQUIPMENT CONTROL," filed on Jan. 31, 2011, by Joseph S. Stam et al.; and U.S. Pat. No. 8,543,254 B1, entitled "VEHICULAR IMAGING SYSTEM AND METHOD FOR DETERMINING ROADWAY WIDTH," filed Mar. 28, 2012, by Jeremy A. Schut et al., which are incorporated by reference herein in their entirety.

Figure 3A:
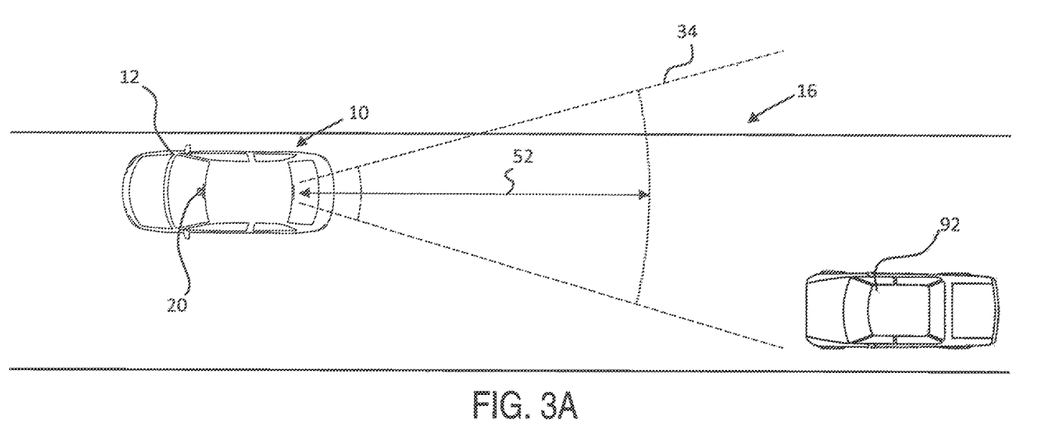
FIG. 3A is an environmental view of a vehicle having a display system demonstrating a field of view of the display system.
Figure 3B:
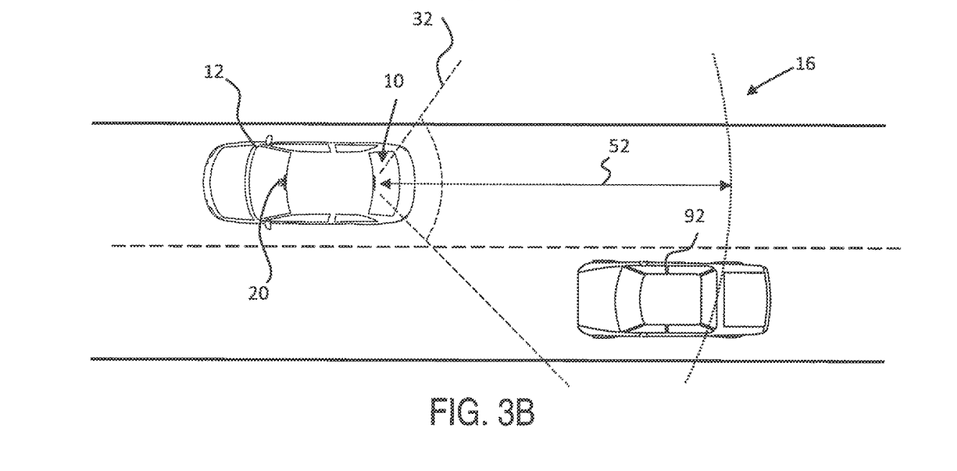
FIG. 3B is an environmental view of a vehicle having a display system demonstrating a field of view of the display system.

In response to an object, for example an approaching vehicle being detected in the first distance range 52, the system 10 may alter the field of view of the data displayed on the display 20 to the first field of view 32. For example, if the vehicle 12 is traveling at a speed such that the first speed threshold is exceeded, the processor 18 is configured to display the second field of view 32 corresponding to the second viewing angle 44. The second viewing angle 44 is narrower than the first viewing angle 42, such that the approaching vehicle may not be clearly visible in the display 20 if the approaching vehicle is in the first distance range 52. In response to detecting the approaching vehicle in the first distance range 52, the processor 18 is configured to control the field of view displayed on the display 20 to the first field of view 32 corresponding to the first viewing angle 42. FIGS. 3A and 3B demonstrate an example of the system 10 changing a field of view in response to an approaching vehicle. A more detailed discussion is provided below.

While the approaching vehicle is in the first distance range 52, the processor maintains the first field of view 32 to ensure that the approaching vehicle is clearly visible in the display 20 to provide important visual information to an operator of the vehicle 12. Once the approaching vehicle exits the first distance range, for example by overtaking the vehicle 12, diverging from a path of the vehicle 12, or trailing into the second distance range 54, the processor is configured to return the field of view displayed on the display 20 corresponding to the speed of the vehicle 20 according to the first and second speed thresholds. The intelligent operation of the display system 10 disclosed herein provides improved safety in vehicle operation by displaying relevant information to an operator of the vehicle 12 in various situations.

In this implementation, the imager 14 is shown mounted such that the rearward view from the vehicle originates from an upper portion of a rear windshield of the vehicle 12. In some implementations, an imager 56 may be proximate a rear vehicle portion. In some implementations, an imager may correspond to a plurality of imagers incorporated in the side mirrors 58 and in a rear portion 14, 56. The plurality of imagers may be configure to provide a broad panoramic view of the rearward facing field of view 16 from the vehicle 12 that may similarly be controlled by the processor 18 to display the fields of view 32, 34, 36 on the display 20.

The following references may include various implementations for imager systems providing rearward facing panoramic views and are incorporated herein by reference in their entirety: U.S. Pat. No. 8,237,909 B2, entitled "VEHICLE REARVIEW MIRROR ASSEMBLY INCLUDING INTEGRATED BACKLIGHTING FOR A LIQUID CRYSTAL DISPLAY (LCD), filed Feb. 6, 2009, by John B. Ostreko et al.; and U.S. Pat. No. 8,411,245, entitled "MULTI-DISPLAY MIRROR SYSTEM AND METHOD FOR EXPANDED VIEW AROUND A VEHICLE," filed Sep. 30, 2009, by Ethan J. Lee et al. Though the display 20 in the various implementations disclosed herein is shown incorporated in a rearview display system, a display 62 may similarly be incorporated in a vehicle forward center console, heads up display, or in any other location that may be visible to an operator of the vehicle 12.

Referring now to FIG. 2, a block diagram of the system 10 is shown in accordance with the disclosure. The system 10 includes the imager 14, the display 20, and a processor 72 incorporated in the processing unit 18. The processing unit 18 and the processor 72 is in communication with the imager 14 and the display 20. The imager 14 is configured to capture images of a scene approximately rearward of the vehicle 12. Data corresponding to the images is communicated from the imager 14 to the processor 72. The processor 72 is configured to process the data and identify an object or a plurality of objects in the data corresponding to the captured images. Upon detection of at least one object, the processor 72 is operable to determine if the object is within a first distance range 52. The processor 72 is further in communication with a plurality of vehicle data inputs 74 and configured to receive operating data from the vehicle 12 through the data inputs 74. In response to the detection of the object in the first distance range 52 and vehicle operating data, the processor is operable to control a field of view displayed on the display 20.

The processor 72 is further in communication with a memory 76. The distance of an object may be determined based on a comparison of various objects that are stored in the memory 76. The information stored in the memory 76 may correspond to one or more algorithms configured to detect objects in pixel data received from the imager. In some implementations, the memory may also be configured to store reference information to provide various thresholds or proportions of an object to determine if the object is within the proximity 22 or the first distance range 52. The memory 76 may further be configured to store the image data during various processing operations of the processor 72.

The vehicle inputs 74 may be configured to communicate information from a variety of vehicle systems and/or sensors to the system 10. In some implementations, the processing unit 18 is in communication with a vehicle bus D1, such that the processor 72 may receive data representative of the vehicle's operating parameters. The speed of the vehicle 12 may be received via a vehicle bus D1 or another vehicle data input 74. The inputs D2-D4, and additional inputs (not shown) may further be configured to provide additional operating information of the vehicle 12, for example turn signal activation, object detection, brake pedal location or input, yaw rate, steering wheel angle, gear selection, etc. For example, in some implementations, one of the vehicle data inputs 74 may be in communication with at least one of a proximity sensor, an ultrasonic proximity sensor, or any other type of sensor that may be configured to detect an object or a presence of an object at a predetermined distance or threshold.

The display 20 is configured to display a scene captured by the imager 14. The display is located in view of an operator of the vehicle 12 and may replace or be integrated into the rearview mirror system. The display may comprise an LCD, CRT, OLED, microdisplay, plasma, or a projection video display. The display 20 may be incorporated in the vehicle 12 in any location such that an operator can view the display 20. In some implementations, the display 20 may replace a rearview mirror, be integrated into a center console of dash portion of the vehicle 12, or be integrated behind a reflective element (e.g., partially reflective, partially transmissive electro-optic element) in the rearview mirror.

As previously discussed, the system 10 is configured to change from the second or third field of view 34, 36 to the first field of view 32 in response to a detected vehicle. In some implementations, the processing unit is further configured to control a panning or rotating function of the imager 14 or a panning function of the image data displayed on the display 20. The processing unit 18 may be operable to pan between left and right positions and/or between up and down positions of the image data displayed on the display 20. Panning may be based upon but not limited to, if the vehicle is turning or traveling upon a curved stretch of road. An example implementation demonstrating a panning operation of the system 10 is shown in reference to FIGS. 5A and 5B. A more detailed discussion of this feature is provided below.

The processing unit 18 may be operable to alter the fields of view optically or digitally to display each of the viewing angles 42, 44, 46 in response to the speed thresholds and a detected object. The captured images or the data representative of the captured images may be altered or changed in a variety of ways by the processing unit 18 and may be implemented differently depending on a particular implementation of system 10 (e.g., digital alteration, optical alteration, etc.). If the system 10 digitally alters the displayed image, the image data representative of the scene rearward of the vehicle is altered in the processing unit 18. If the system implements an optical zoom, the captured images are altered by the field of view 16 of the imager 14. In some implementations, a combination of optical and digital zooming processes may be combined to alter the field of view on the display 20.

The processing unit 18 may further be in communication with a plurality of manual inputs 78. The manual inputs 78 are configured such that a user may actuate or activate an alteration in an image on the display 20. The alteration may correspond to a change in the displayed field of view by zooming and/or panning the image data displayed on the display 20. The manual inputs are configured to receive user inputs via a plurality of switches denoted S1-S3. Though three switches are shown in this particular example, the number of the plurality of switches may vary.

The plurality of switches S1-S3 may be implemented in the vehicle 12 in the form of mechanical buttons (e.g., tactile switches, flipper switches, toggle switches, etc.), a proximity or touch switches (e.g., capacitive switches, optical switches, slide switches, etc.), or any other form of switch configured to receive an input. Thus, the manual inputs 78 can be configured so a user can manually control a zoom or field of view of the image data on the display 20. In some implementations, the manual inputs may be configured to allow a user to control or alter the displayed image by controlling a zoom ratio or a panning function of the image data from left to right, up-down. The manual inputs 78 may further be configured allow a user to change each field of view for a particular speed threshold value and customize or manually input the first and second speed threshold values. At least one manual input may be configured to communicate a manual override to the processor 78. The manual override may be configured to activate or deactivate the display system 10 or a dynamic zoom function of the system 10.

By way of explanation and not limitation, the display system 10 may be used in the vehicle to replace one or more of the rearview mirrors. The display system 10 may also be used in a display mirror assembly in combination with an electrochromic mirror or conventional mirror. In each of the implementations described herein, the display system 10 may be configured to alter the image data displayed on the display 20 (e.g., change the field of view of the displayed image) based upon one or more of the vehicle inputs (e.g., vehicle's operating parameters) and the detection of at least one object.

Referring now to FIGS. 3A and 3B, the display system 10 is shown in an operating environment demonstrating the viewing angle 16 of the displayed images on the display 20 changing from the second field of view 34 to the first field of view 32. The vehicle 12 is shown in each of FIGS. 3A and 3B travelling at a speed that is in excess of the first speed threshold, but less than the second speed threshold.

In FIG. 3A, an object in the form of an approaching vehicle 92 is shown in a first position outside the first distance range 52. In response to the vehicle 12 travelling at a speed exceeding the first speed threshold, the processing unit 18 detects the speed of the vehicle 12 and controls the field of view 16 on the display 20 to display the second field of view 34. As demonstrated in FIG. 3A, the approaching vehicle 92 is within the second field of view 34 such that the operator of the vehicle 12 can see the approaching vehicle 92 on the display 20. The display system 10 is configured to focus on the most relevant information in response to the operating environment of the vehicle 12. Images of the operating environment rearward of the vehicle are provided to the operator in the field of view 16 communicated to the display 20 by the processing unit 18 such that the operator may operate the vehicle 12 with an improved awareness of the operating environment.

In FIG. 3B, the approaching vehicle 92 is shown within the first distance range 52 of the vehicle 12. In response to the detection of the object in the form of the approaching vehicle 92, the processing unit 18 of the system 10 is configured to detect the approaching vehicle in the image data or based on any other detection method as discussed above. In response to the detection, the processing unit 18 is configured to change the field of view 16 displayed on the display 20. As discussed previously the field of view may be altered or changed by a variety of methods. For example, the field of view displayed on the display 20 may be optically altered or digitally altered by the processing unit 18 to change the field of view 16.

In this example, the field of view 16 is changed by the processing unit 18 from the second field of view 34 to the first field of view 32. By changing the field of view, the system 10 provides a view on the display such that the field of view includes the approaching vehicle 92. The system 10 provides various benefits by providing the operator of the vehicle 12 with the most relevant information corresponding to a particular operating environment. By altering the field of view and detecting the approaching vehicle 92, the system 10 provides for an improved rearward view from the vehicle 12 to improve the awareness of the operator and to help ensure safe operation of the vehicle 12.

Figure 4:
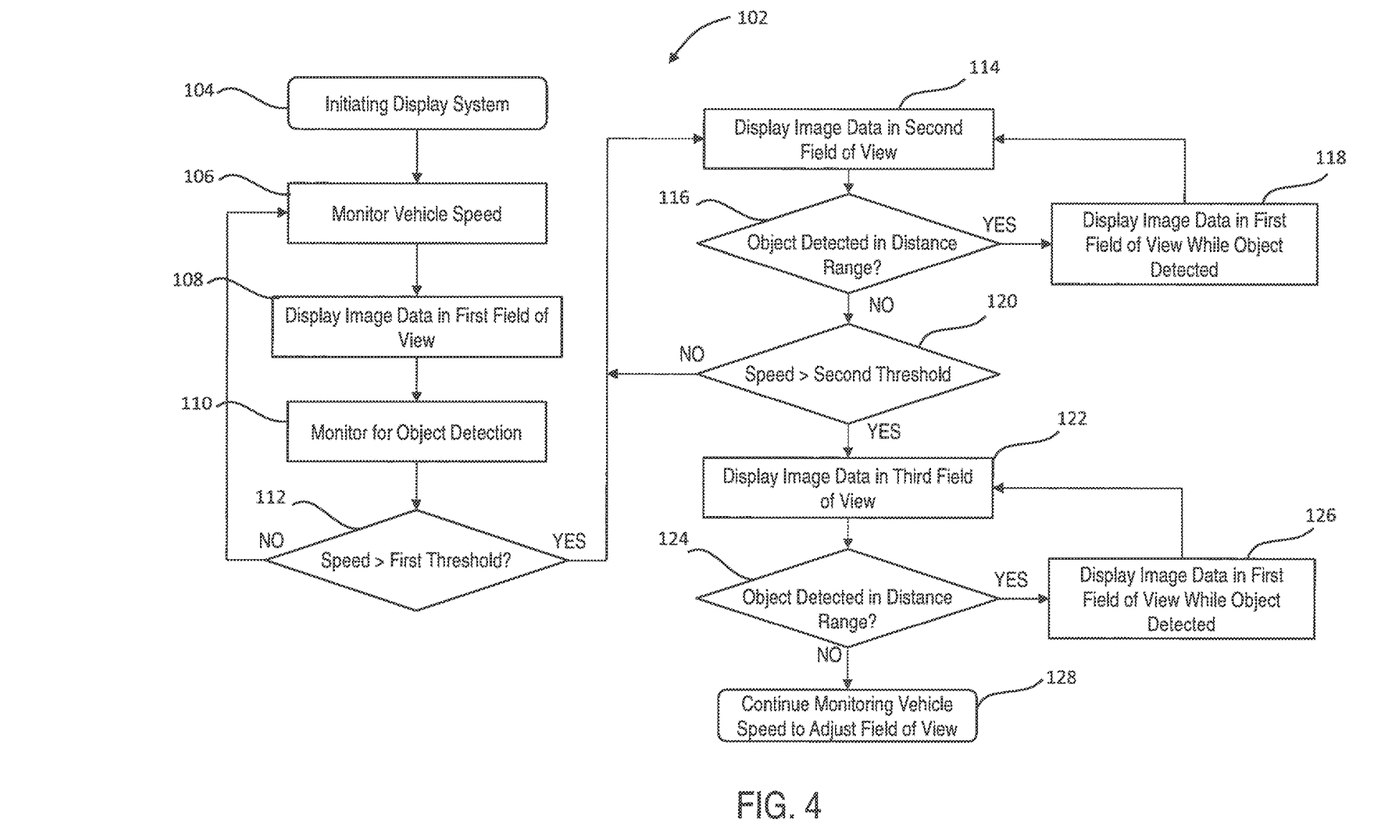
FIG. 4 is a flow chart illustrating a method of adjusting an image displayed on a display system.

Referring now to FIG. 4, a method 102 of controlling the display system 10 is shown. The method 102 may begin by initiating the display system 10, for example in response to the vehicle 12 being started (104). When the system 10 is activated, the processing unit 18 monitors the speed of the vehicle 12 from at least one of the vehicle data inputs 74 (106). The system is configured to initially display a standard or the first field of view 32 on the display 20 in view of the driver (108). The system 10 is further configured to monitor the first distance range 52 to detect an object or approaching vehicle 92 (110).

As the vehicle 12 begins to accelerate, the processing unit 18 monitors the speed of the vehicle 12 (112). If the processing unit 18 determines that the vehicle 12 has exceeded the first speed threshold, images displayed on the display 20 are altered to show the second field of view 34 corresponding to an enlarged or zoomed field of view relative to the first field of view 32 (114). For example, the field of view may be altered from approximately 80 degrees to approximately 60 degrees. If the processing unit does not detect that the first speed threshold is exceeded, the method 102 returns to step 106.

While the processing unit 18 detects that the vehicle is traveling at speeds between the first speed threshold and the second speed threshold, the processing unit will determine if an object is detected in the first distance range 52 (116). If an object is detected, the processing unit 18 will respond by changing the images displayed on the display, from the second field of view 34 to the first field of view 32 while the object is detected (118). For example, the first field of view 32 is maintained while an approaching vehicle 92 is detected in the first distance range 52. Once the approaching vehicle 92 is no longer detected, the processor returns the field of view of the display 20 to the field of view corresponding to the speed of the vehicle 12, in this case, the second field of view 34.

If no object is detected and the vehicle 12 continues to accelerate (e.g., to highway or freeway speeds, etc.), the relevant information rearward the vehicle 12 may be objects that are further away from the vehicle 12. To improve the view provided to the operator, the processing unit 18 is configured to determine if the vehicle has exceeded the second speed threshold (120). If the processing unit 18 determines that the vehicle 12 has exceeded the second speed threshold, the processing unit 18 changes the field of view on the display 20 to the third field of view 36 corresponding to an enlarged or zoomed field of view relative to the second field of view 34 (122). For example, the field of view may be altered from approximately 60 degrees to approximately 40 degrees. If the processing unit does not detect that the first speed threshold is exceeded, the method 102, returns to step 114.

While the processing unit 18 detects that the vehicle 12 is traveling at a speed exceeding the second speed threshold, the processing unit 18 will determine if an object is detected in the first distance range 52 (124). If an object is detected, the processing unit 18 will respond by changing the images displayed on the display, from the third field of view 36 to the first field of view 32 while the object is detected (126). Once the approaching vehicle 92 is no longer detected, the processing unit 18 returns the field of view of the display 20 to the field of view corresponding to the speed of the vehicle, in this case, the third field of view 36.

If no object is detected and the vehicle 12 remains above the second speed threshold, the displayed image remains in the third field of view 36. The processing unit 18 will then continue to monitor the vehicle speed and monitor for the detection of an object (128). If the vehicle begins to decelerate and drops below the second speed threshold, the images displayed on the display 20 may be altered by the processing unit 18 to a field of view corresponding to each of the first and second speed thresholds. The method 102 may continue throughout operation of the vehicle 12 and in some cases may be deactivated in response to an input from an operator of the vehicle 12 via one of the manual inputs 78. In some implementations, the methods described herein may be implemented as a non-transitory computer readable medium stored as software instructions that, when executed by the processor 72, cause the processor 72 to generate control signals to display images on the display 20 by executing the steps described above.

Figure 5A:
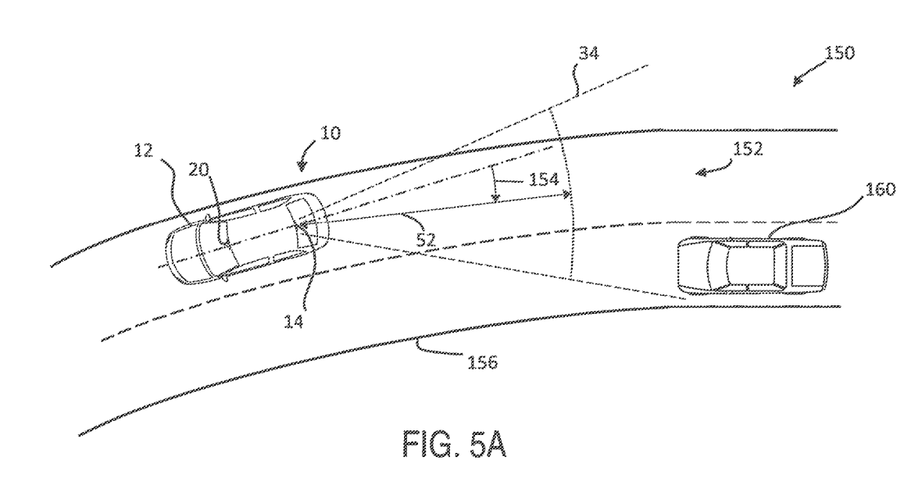
FIG. 5A is an environmental view of a vehicle having a display system demonstrating a field of view of the display system.
Figure 5B:
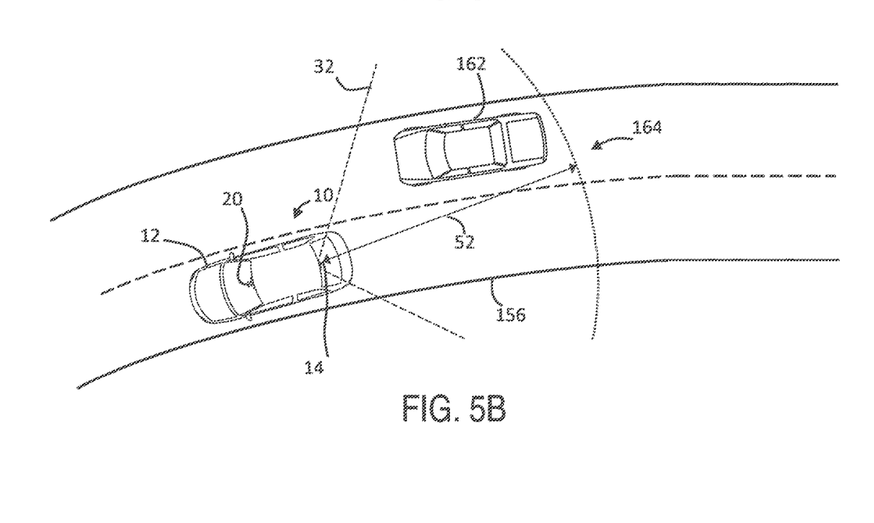
FIG. 5B is an environmental view of a vehicle having a display system demonstrating a field of view of the display system in accordance with the disclosure.

Referring now to FIGS. 5A and 5B, the display system 10 is shown in an operating environment 150 demonstrating a panning function of the display system 10. The vehicle 12 is shown in each of FIGS. 5A and 5B approaching a turn and travelling at a consistent speed that is in excess of the first speed threshold, but less than the second speed threshold. In FIG. 5A, the rearward directed field of view 152 is shown panned or angled by a rotation angle 154. The panning or rotating functionality of the system 10 may be applied in some implementations to further improve the information provided to an operator of the vehicle 12 on the display 20.

In various implementations, the processing unit 18 may be operable to control a panning or rotating operation of the imager 14. The panning operation may be controlled by the processing unit 18 in response to the vehicle 12 turning or traveling along a curved portion 156 of a roadway. The panning operation may consist of changing an angle of the imager 14 by a rotation angle or panning the image data captured by the imager 14 such that the information provided to an operator of the vehicle 12 is focused on the road during the curve 156. Panning the image data may comprise digitally panning the image information to effectively display the field of view 152 as though the imager 14 was rotated at the rotation angle 154. The panning or rotating functionality of the system 10 may further improve the relevancy of the information provided to an operator of the vehicle 12 by focusing on the road while the vehicle 12 is traveling along the curve 156.

For example, the vehicle 12 is shown in FIG. 5A traveling along the curved portion 156 of the road and the display system 10 is displaying the second field of view 34 in response to the first speed threshold being exceeded. The panning operation may provide for the field of view to be improved by providing an angled view of the field of view 152. The angled field of view 152 may allow the narrow or zoomed extents of the second field of view 34, or the third field of view 36 in other scenarios, to be directed at the road in response a curve in the road being detected by the processing unit 18. The rotation angle 154 or panning angle may vary based on the speed of the vehicle 12 and vehicle operating data provided to the controller via the vehicle data inputs. In some implementations the panning or rotating information may also be detected in the data representative of the images captured by the imager 14 via a road or lane detection algorithm configured to detect a curve in the road. The panning or rotating information may also be in response to the detection of an object.

The rotation angle 154 may be controlled in by the processing unit 18 in response to the radius of the curve 156 as detected by the processing unit 18 from steering or wheel turning data, yaw rate, and/or the speed of the vehicle 12. Further, the direction and rotation angle 154 may be detected in the data representative of the images captured by the imager 14 by detecting the edge of the road, a lane line or any other road way features that are captured in the image data. Similar image data processing techniques as those implemented to detect an approaching vehicle 160 as discussed in reference to FIG. 2 may be applied by the processing unit 18 to detect the curve 156. The angle of rotation 154 or panning of the image information may vary based on the operating environment 150 in which the vehicle 12 is operating. In the example shown in FIG. 5A, the rotation angle 154 shown may be exaggerated to clearly illustrate the direction of rotation or panning controlled by the processing unit 18.

In FIG. 5B, the approaching vehicle 162 is shown having approached the vehicle 12 within the first distance range 52. In response to the detection of the object in the form of the approaching vehicle 162, the processing unit 18 of the system 10 is configured to detect the approaching vehicle 162 and change a field of view 164 displayed on the display 20. As discussed previously the field of view 164 may be altered or changed by a variety of methods. For example, the field of view displayed on the display 20 may be optically altered by changing the field of view 164 of the imager 14 or digitally altered by the processing unit 18 by changing the field of view 164 of the data representative of images captured by the imager 14.

In this example, the field of view 164 is changed by the processing unit 18 from the second field of view 34 to the first field of view 32. By changing the field of view, the system 10 provides an improved view on the display 20 such that the operator of the vehicle 12 is provided the most relevant information corresponding to the operating information of the vehicle 12 and the operating environment. The system 10 is configured to provide the operator of the vehicle 12 with the most relevant information corresponding to a particular operating environment to improve the awareness of the operator and to help ensure safe operation of the vehicle 12.

Examples of a display mirror are described in U.S. Pat. No. 8,879,139, entitled "DISPLAY MIRROR ASSEMBLY," filed on Mar. 14, 2013, by Richard T. Fish et al.; and U.S. Pat. No. 9,598,018, entitled "DISPLAY MIRROR ASSEMBLY," filed on Mar. 15, 2013, by Ethan J. Lee et al., all of which are hereby incorporated herein by reference in its entirety.

A rearview mirror or display mirror may comprise a glass element in the form of an electro-optic element or an element such as a prism. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase.

The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," filed Mar. 15, 1996, by William L. Tonar et al.; U.S. Pat. No. 5,998,617 entitled "ELECTROCHROMIC COMPOUNDS," filed Apr. 2, 1997, by Ramanujan Srinivasa et al.; U.S. Pat. No. 6,020,987 entitled "ELECTROCHROMIC MEDIUM CAPABLE OF PRODUCING A PRE-SELECTED COLOR," filed Apr. 2, 1997, by Kelvin L. Baumann et al.; U.S. Pat. No. 6,037,471 entitled "ELECTROCHROMIC COMPOUNDS," filed Aug. 26, 1998, by Ramanujan Srinivasa et al.; U.S. Pat. No. 6,141,137 entitled "ELECTROCHROMIC MEDIA FOR PRODUCING A PRESELECTED COLOR," filed Apr. 26, 1999, by Harlan J. Byker et al.; U.S. Pat. No. 6,241,916 entitled "ELECTROCHROMIC SYSTEM," filed Feb. 4, 1997, by Uwe Claussen et al.; U.S. Pat. No. 6,193,912 entitled "NEAR INFRARED-ABSORBING ELECTROCHROMIC COMPOUNDS AND DEVICES COMPRISING SAME," filed Mar. 3, 1998, by Dave Thieste et al.; U.S. Pat. No. 6,249,369 entitled "COUPLED ELECTROCHROMIC COMPOUNDS WITH PHOTOSTABLE DICATION OXIDATION STATES," filed Jul. 9, 1999, by David A. Theiste et al.; U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," filed Apr. 30, 1999, by Thomas F. Guarr; U.S. Pat. No. 6,519,072 entitled "ELECTROCHROMIC DEVICE," filed Aug. 16, 2001, by Yoshinori Nishikitani et al.; and International Patent Application Publication Nos. WO 1998/42796 A1 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," filed Mar. 26, 1998, by Anoop Agrawai et al.; WO 1999/02621 A1 entitled "ELECTROCHROMIC POLYMER SYSTEM," filed Jun. 24, 1998, by Horst Berneth et al. which are herein incorporated by reference in their entirety. The glass element 12 may also be any other element having partially reflective, partially transmissive properties. To provide electric current to the glass element 12, electrical elements 52 are provided on opposing sides of the element, to generate an electrical potential therebetween. A J-clip 54 is electrically engaged with each electrical element 52, and element wires extend from the J-clips 54 to the primary PCB 28.

The present disclosure may be used with a mounting system such as that described in U.S. Pat. No. 8,201,800 entitled "TWO BALL MOUNT WITH WIRING PASSAGE," filed Aug. 6, 2008, by Kenneth R. Fillipiak; U.S.

Pat. No. 8,210,695 entitled "CHANNELED MIRROR MOUNT," filed Apr. 30, 2009, by Mark R. Roth et al.; U.S. Pat. No. 9,174,577 entitled "MOUNT INTERFACE TO SLIDE ON WINDSCREEN BUTTON," filed Aug. 31, 2012, by Bradley L. Busscher; U.S. Patent Application Publication No. 2012/0327234 A1, now U.S. Pat. No. 9,838,653, entitled "ROOF MOUNTED IMAGER MODULE," filed Jun. 19, 2012, by Richard T. Fish; U.S. Pat. No. 8,925,891 entitled "REVERSE DETACH MOUNTING SYSTEM," filed Mar. 27, 2012, by Christopher J. Van Huis; U.S. Pat. No. 8,814,373 entitled "REARVIEW DEVICE SUPPORT ASSEMBLY," filed Feb. 22, 2012, by Robert Steel; U.S. Pat. No. 8,201,800 entitled "TWO BALL MOUNT WITH WIRING PASSAGE," filed Aug. 6, 2008, by Kenneth R. Fillipiak; U.S. Pat. No. 8,960,629 entitled "REARVIEW MOUNTING DEVICE," filed Mar. 13, 2013, by Peter N. Rizk et al.; U.S. Pat. No. 9,244,249 entitled "DOUBLE BALL SLIDE ON MOUNT WITH SCREW OVER SENSOR," filed Sep. 26, 2013, by Chul Bock Kim et al.; and U.S. Provisional Patent Application Ser. No. 61/704,869, which are hereby incorporated herein by reference in their entirety.

Further, the present disclosure may be used with a rearview packaging assembly such as that described in U.S. Pat. No. 8,264,761 entitled "VEHICLE REARVIEW MIRROR WITH SPOTTER MIRROR," filed Jan. 4, 2011, by David J. Cammenga et al.; U.S. Pat. No. 8,885,240 entitled "REARVIEW ASSEMBLY FOR A VEHICLE," filed Aug. 6, 2012, by Mark R. Roth; U.S. Pat. No. 8,646,924 entitled "A REARVIEW DEVICE MOUNTING ASSEMBLY WITH ROTATABLE SUPPORT," filed Feb. 7, 2012, by Mark R. Roth; U.S. Pat. No. 8,814,373 entitled "REARVIEW DEVICE SUPPORT ASSEMBLY," filed Feb. 22, 2012, by Robert Steel; U.S. Pat. No. 8,643,931 entitled "VEHICLE REARVIEW MIRROR WITH SPOTTER MIRROR," filed Jun. 29, 2011, by David J. Cammenga; and U.S. Pat. No. 9,316,347 entitled "REARVIEW ASSEMBLY WITH INTERCHANGEABLE REARWARD VIEWING DEVICE," filed Jan. 24, 2013, by Mark R. Roth; and U.S. Provisional Patent Application No. 61/707,625; which are hereby incorporated herein by reference in their entirety. Additionally, it is contemplated that the present disclosure can include a bezel such as that described in U.S. Pat. No. 8,201,800 entitled "TWO BALL MOUNT WITH WIRING PASSAGE," filed Aug. 6, 2008, by Kenneth R. Filipiak; U.S. Pat. No. 8,210,695 entitled "CHANNELED MIRROR MOUNT," filed Apr. 30, 2009, by Mark R. Roth et al.; and U.S. Pat. No. 8,827,517 entitled "CLEAR BEZEL," filed Oct. 12, 2011, by David J. Cammenga which are hereby incorporated herein by reference in their entirety.

A display mirror assembly according to the present disclosure has several advantages. The display module is supported by the front shield and rear shield, and does not require a separate support or carrier plate. Omission of a carrier plate, and inclusion of retaining features in the front shield and rear shield, permits the display mirror assembly to be lighter, involve fewer parts for manufacturing, and to have a display which is viewable over a larger percentage of the total viewing area of the display mirror assembly.

It will be appreciated that implementations of the disclosure described herein may be comprised of one or more conventional processors and unique stored program instructions that control one or more processors to implement, in conjunction with certain non-processor circuits, some, most, or all of the functions of the display system 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches may be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary implementations of the disclosure described herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosed implementations are only provided as illustrative examples. Although only a few implementations of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system 10 may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary implementations without departing from the spirit of the present innovations.

Modifications of the disclosure will occur to those skilled in the art and to those who make or use the disclosure. Therefore, it is understood that the implementations shown in the drawings and described above are merely for illustrative purposes and not intended to limit the scope of the disclosure, which is defined by the following listing of the claims.

What is claimed is:

1. A display system for use in a vehicle, comprising:
   an imager configured to capture images corresponding to a captured field of view rearward of the vehicle;
   a processing unit in communication with the imager, the processing unit configured to receive data representative of the captured images;
   a display in communication with the processing unit, the display configured to display images based on the data representative of the captured images received by the processing unit; and
   wherein the processing unit is configured to:
      detect a curve direction of a road depicted in the data representative of the captured images with a curve detection algorithm; and
      adjust a position of a selected portion of the captured field of view based on the curve direction.

2. The display system according to claim 1, wherein the processing unit is configured to:
   receive vehicle directional data from a sensor of the vehicle;
   process the directional data to identify an operating direction of the vehicle; and
   control the field of view of the images displayed on the display in response to the directional data.

3. The display system according to claim 2, further comprising:
   a direction detector configured to identify the operating direction, wherein the direction detector comprises a steering angle detector configured to measure the operating direction of the vehicle.

4. The display system according to claim 2, wherein the direction detector comprises a yaw rate sensor configured to measure the operating direction of the vehicle.

5. The display system according to claim 2, wherein the processing unit is further configured to:
   pan the imager adjusting a display angle of the captured field of view in response to the operating direction of the vehicle.

6. The display system according to claim 1, wherein the captured field of view comprises a displayed field of view focusing on the selected portion of the captured field of view.

7. The display system according to claim 6, wherein the processing unit is further configured to:
   pan a position of the displayed field of view in the captured field of view based on an operating direction of the vehicle.

8. The display system according to claim 6, wherein the processing unit is further configured to:
   control the display to display the displayed field of view such that the extents of the displayed field of view extend to a perimeter of the display.

9. The display system according to claim 6, wherein the processing unit is further configured to:
   control the display to display the displayed field of view as a zoomed portion of the captured field of view.

10. A system for presenting a rearward view from a vehicle, comprising:
    an imager configured to capture images comprising an optic field of view rearward of the vehicle;
    a processing unit in communication with the imager, the processing unit configured to receive data representative of the captured images;
    a display in communication with the processing unit, the display configured to display images based on the data representative of the captured images received by the processing unit in a displayed field of view; and
    wherein the processing unit is configured to:
       receive vehicle directional data from a sensor of the vehicle;
       process the directional data to identify a steering direction of the vehicle;
       dynamically alter the displayed field of view of the data representative of the captured images based on the steering direction of the vehicles;
       detect an object within a distance range of the vehicle based on the data representative of the captured images; and
       expand the displayed field in response to the detection of the object within the distance range.

11. The system according to claim 10, wherein the sensor comprises a steering sensor configured to detect a steering angle of the vehicle.

12. The system according to claim 11, wherein the processing unit is further configured to:
    pan the imager adjusting a display angle of the captured field of view in response to the steering angle of the vehicle.

13. The display system according to claim 11, wherein the processing unit is further configured to:
    adjust a position of the displayed field of view within the captured field of view in response to the steering angle of the vehicle.

14. The display system according to claim 11, wherein the processing unit is further configured to:
    pan a position of the displayed field of view in the captured field of view commensurate to a magnitude and direction of the steering angle of the vehicle.

15. The system according to claim 10, wherein the processor is further operable to change an extent of the displayed field of view from a first field of view to a second field of view in response to the vehicle exceeding a speed threshold communicated in vehicle operating data.

16. The system according to claim 15, wherein the second field of view comprises zoomed extents focusing on a smaller portion of the optic field of view.

17. A method of controlling a display system of a vehicle, the method comprising a display processing unit, the steps of:
    receiving and analyzing image data from an imager of a scene rearward of a vehicle;
    detecting an operating direction of the vehicle, wherein the operating direction is detected based on a steering angle of the vehicle;
    displaying the image data on a display;
    dynamically altering the displayed image data by changing a portion of the field of view of the image data displayed based on the steering angle of the vehicle; and
    detecting a curve direction of a road depicted in the image data with a curve detection algorithm and adjusting a position of the portion of the field of view in the curve direction.

* * * * *